3,023,063
UNDERHOOD TRAY FOR AUTO MECHANICS
Paul E. Hansen, 2246 Cowlin Ave., Los Angeles, Calif.
Filed July 5, 1960, Ser. No. 40,812
3 Claims. (Cl. 311—21)

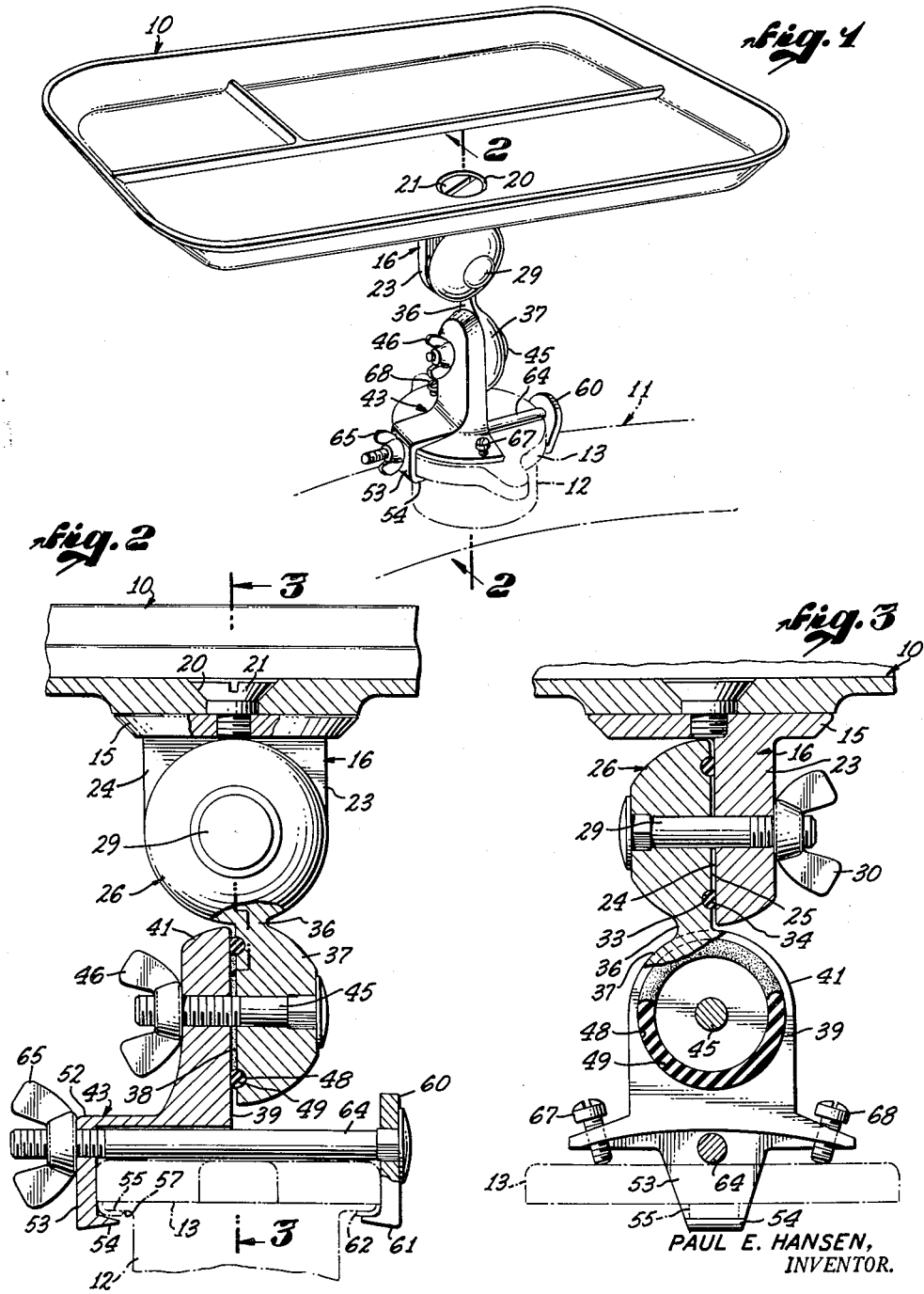

This invention relates to a tray and particular supporting means therefor whereby the tray may be conveniently supported in close proximity to and over the engine of an automobile when the hood is lifted. The tray is provided with supporting means attachable to the radiator cap of the automobile and so constructed and arranged that the tray can be conveniently supported in the desired position irrespective of the exact location or angle of the radiator filler pipe and cap. The purpose of the invention is to provide a convenient place for holding tools or other articles while a mechanic or other person is servicing the engine of the automobile. A further purpose is to provide a simple, convenient, and effective way for supporting the tray as described which is universally adaptable in any automobile. The invention resides particularly in the means for mounting the tray by supporting it from the radiator cap and providing adjustments so that the tray can be positioned level irrespective of the location or angle of the radiator filler pipe and cap.

The invention comprises a tray on an adjustable support bracket allowing for rotation of the tray about a vertical axis and also for tilting movement of the tray and securement in a horizontal position. The support bracket includes an adjustable clamp adapted for clamping the mount to the radiator cap and additional clamps having wing nuts whereby the support allows adjusting of the tray about either of two horizontal transverse axes. As stated above, the tray is rotatable about a vertical axis. Thus, the mount provides for universal adjustment of the tray so that it can be set and secured conveniently in a horizontal position over the engine irrespective of the location as stated above of the filler about and radiator cap.

Accordingly, the primary object of the invention is to serve and fulfill the purposes as stated in the foregoing.

A further more specific object is to provide a support mount for a tray or the like as in the foregoing comprising adjustable bracket or clamp configurated to be adapted to securely clamp to a radiator cap, the mount including adjustable means whereby a tray or the like supported therefrom may be readily adjusted about either of two transverse horizontal axes whereby universal positioning of the tray or the like is achieved.

Further objects and additional advantages of the invention will become apparent from the following detail description and annexed drawings, wherein:

FIG. 1 is a perspective view of a preferred form of the invention mounted on the radiator cap of an automobile;

FIG. 2 is a sectional view taken along the line 2—2 of FIG. 1;

FIG. 3 is a sectional view taken along the line 3—3 of FIG. 2.

In FIG. 1, the tray is designated at 10 on it as shown with reference to an automobile engine, the radiator being diagrammatically indicated at 11, the filler spout at 12, and the radiator cap at 13. The tray is supported on the horizontal part 15 of a bracket 16. The tray has an opening 20 therethrough in which passes a screw 21 with a beveled head which screws into the horizontal part 15 of bracket 16. The head of the screw comes substantially flush with the bottom of the tray or pan 10 which may have partitions as shown. The tray 10 is mounted loosely enough on the screw 21 so that it can be rotated about a vertical axis which would be the axis of the screw 21 to a desired convenient position over or with respect to the engine of the automobile.

The bracket 16 has a downwardly extending portion 23 as may be seen in FIG. 3 having a flat face 24 which is juxtaposed against the face 25 of another bracket member 26. The brackets or bracket member 16 and 26 each have a bore therethrough which extends a bolt 29 on the end of which is a wing nut 30 for securing the two brackets together. The bracket member 26 has an annular groove in its face as shown at 33 in which is received an O-ring 34 which is compressed when the brackets are forced together by the wing nut and thus the bracket members may be firmly secured and held in any desired position.

The upper part of the bracket member 26 is generally hemispherical and it is connected by a neck or reduced portion 36 to another generally hemispherical portion 37 having a flat face 38. The flat face 38 is juxtaposed against or adjacent the flat face 39 of a portion 41 of the bracket 43 which is attached to the radiator cap 13. The bracket members 37 and 41 each have a bore therethrough as shown through which extends a bolt 45 having a wing nut on its end as shown at 46 whereby these parts may be secured together. The bracket member 37 has an annular groove 48 in its face in which is an O-ring 49 which is compressed when these parts are secured together by the wing nut so that they can be firmly set and held in a desired position.

The bracket 43 has a base part 52 which is generally semi-circular and which has a downwardly extending lug 53 having an inwardly turned ear 54 which engages underneath the radiator cap 33 and more particularly underneath the lug or ear 55 on the radiator cap which fits or secures underneath the flange 57 at the top of the filler spout 12. Numeral 60 designates another lug similar to the lug 53 which is diametrically opposed therefrom. It has an inwardly extending ear 61 which engages underneath the lug or ear 62 at the opposite side of the radiator cap 13. The lugs 53 and 60 have bores therethrough which are aligned as shown and through which extends a fastening bolt 64 having a wing nut 65 at its end for firmly securing the mounting or support for the tray to the radiator cap.

The extending portions or tips of the semi-circular part 52 of the bracket 53 have set screws 67 and 68 threaded therethrough and the ends of which engage diametrically opposed parts of the top of the radiator cap 13 as shown so that the bracket 43 may be firmly clamped to the radiator cap and adjusted to be aligned with the axis of the cap. The underside of the bracket 43 preferably has a slightly rounded configuration as shown at 71.

The operation and use of the invention will be readily apparent to those skilled in the art. The tray bracket or support means is clamped to the radiator cap in the manner described with the ears of the lugs 53 and 60 engaged underneath the ears or lugs on the underside of the radiator cap. The bracket 43 is adjusted to a position coaxial with the radiator cap 13 by the set screws 67 and 68. The bolts 29 and 45 provide two mutually transverse axes with an adjustment about each. That is, irrespective of the angular position of the filler spout 12 in the automobile, the adjustable brackets or supports can be adjusted by loosening the wing nuts 30 and 46 and retightening them so that the tray 10 is in a horizontal position. Or stating it another way, no matter what the angle of displacement of the filler spout 12 is from the vertical, the brackets can be adjusted so that the tray 10 has a vertical position. The tray as shown is rectangular having one longer dimension and by reason of the rotatable feature about the screw 21, it can be rotated to the most convenient position for use and best adapted to the particular geometry or configuration underneath the hood of the particular automobile in which the invention is used.

The invention is of simple design and rugged construction but yet is universally adaptable to any automobile and therefore possesses very practical utility.

The foregoing disclosure represents a preferred form of the invention and is to be interpreted in an illustrative rather than a limiting sense, the invention to be accorded the full scope of the claims appended hereto.

What is claimed is:

1. A universal mounting support for a tray to be supported in proximity to an automobile engine in combination, clamping means including an adjustable clamping member configured for removably clamping to the radiator cap of an automobile, adjustable support bracket members carried by said clamping means comprising relatively rotatable means having a bolt extending therethrough and a wing nut for clamping the relatively rotatable members together, a second support bracket including relatively rotatable members, one of which is carried by one of said first members in a position directly over it and having a clamping bolt extending therethrough and a wing nut for clamping said members together, said last support bracket having its clamping bolt extending in a direction substantially normal to the said first bolt and both of said bolts being substantially parallel to the top of the radiator cap when the mounting support is in position, and one of the members of the said second support bracket having means for carrying a tray whereby the assembly may be removably mounted on a radiator cap and a tray carried by the assembly may be adjusted and set in a horizontal position irrespective of the angle of inclination of the radiator filler spout and cap.

2. The apparatus of claim 1, wherein the relatively rotatable members of both of said support bracket means have relatively flat mutually juxtaposed surfaces and means comprising O-rings interposed between the relatively flat surfaces whereby the relatively rotatable members may be quickly and firmly set in any desired adjusted position.

3. The apparatus of claim 2, wherein said clamping means comprises oppositely disposed lug members positioned for engaging on opposite sides of a radiator cap and adjustable stabilizing members positioned between the lug members for stabilizing engagement with the top of the radiator cap.

References Cited in the file of this patent
UNITED STATES PATENTS

| | | |
|---|---|---|
| 354,976 | Field | Dec. 28, 1886 |
| 363,339 | Kidder | May 17, 1887 |
| 586,081 | Warner | July 6, 1897 |
| 982,567 | Blouch | Jan. 24, 1911 |
| 1,275,311 | Schumacher | Aug. 13, 1918 |
| 2,922,684 | Miller | Jan. 26, 1960 |
| 2,942,920 | French | June 28, 1960 |